United States Patent [19]

Kovari et al.

[11] 4,327,590

[45] May 4, 1982

[54] METHOD AND APPARATUS FOR DETERMINING SHIFTS AT TERRAIN AND IN STRUCTURES

[75] Inventors: Kalman Kovari, Züich; Jakob Köppel, Würenlos; Christian Amstad, Oberhasli, all of Switzerland

[73] Assignee: Gesellschaft zur Forderung der Forschung an der Eidgenössischen Technischen Hochschule, Zürich, Switzerland

[21] Appl. No.: 101,761

[22] Filed: Dec. 10, 1979

[30] Foreign Application Priority Data

Dec. 21, 1978 [CH] Switzerland ............... 12988/78

[51] Int. Cl.³ ............................................. G01B 5/00
[52] U.S. Cl. ..................................................... 73/784
[58] Field of Search ............... 73/784, 151; 33/302; 166/255

[56] References Cited

U.S. PATENT DOCUMENTS

| 3,483,745 | 12/1969 | Üblacker | 73/784 |
| 3,789,511 | 2/1974 | Groom et al. | 73/151 |
| 3,987,667 | 10/1976 | Rasmussen et al. | 73/784 |

FOREIGN PATENT DOCUMENTS

| 920239 | 10/1954 | Fed. Rep. of Germany . |
| 1162601 | 8/1964 | Fed. Rep. of Germany . |
| 1930663 | 1/1970 | Fed. Rep. of Germany . |

*Primary Examiner*—Anthony V. Ciarlante

*Attorney, Agent, or Firm*—Werner W. Kleeman

[57] ABSTRACT

In the medium to be examined there is embedded a measuring tube which possesses at its inner surface essentially equidistantly spaced measuring markers. These measuring markers are in the form of mechanical stops or impact members having an impact surface forming part of a right circular cone. To determine the spacing between neighboring measuring markers there is provided a measuring probe or sensor having two measuring heads connected with one another, by means of a connection tube, such that they are relatively shiftable in the lengthwise axis of the measuring probe. Each measuring head is constructed as a mechanical counter stop having an impact or stop surface forming part of a spherical surface. Internally of the connection tube there is arranged an inductive length transmitter producing an output signal characteristic of the spacing between the measuring heads. By means of a traction rod and a dynamometer and a tension spring both of the measuring heads are brought into contact, by means of their counter impact or stop surfaces, with the stop surfaces of the stops or impact members. The signal generated by the length transmitter is proportional to the spacing or spacing change between both of the measuring heads and thus, also to both of the measuring markers. Relative displacements between both of the measuring markers in the direction of the lengthwise axis of the measuring tube can therefore be directly determined.

46 Claims, 10 Drawing Figures

METHOD AND APPARATUS FOR DETERMINING SHIFTS AT TERRAIN AND IN STRUCTURES

BACKGROUND OF THE INVENTION

The present invention relates to a new and improved method for determining displacements or shifts in the ground or terrain, in rocks, in structures and the like, wherein there is determined the relative position between neighboring measuring locations arranged at a mutual spacing at the medium which is to be examined. The invention further pertains to novel apparatus for the performance of the aforesaid method and is of the type comprising a number of measuring locations arranged in mutually spaced relationship from one another in the medium to be examined. The invention also is concerned with a measuring probe or sensor which is suitable for use in the apparatus of the invention.

With heretofore known equipment of the aforementioned type for measuring shifts in the ground, in rocks or in structures or buildings, for instance by means of a chain extensometer available from the firm Interfels Company, there are fixedly installed measuring heads at the measuring locations of the medium to be examined. Neighboring measuring heads are connected with one another such that there can be detected a lengthwise or spacing change from one measuring head to another measuring head. These stationary devices have, among other things, the drawback that there must be installed at each measuring location a number of measuring heads. These measuring heads cannot or only partially can be reclaimed. Therefore when there are involved a large number of measuring locations an appreciable expenditure in equipment is required. Additionally, these measuring heads, after having been installed, are only at best, if at all, accessible with difficulty, thereby rendering their maintenance and control problematic, if not in fact totally impossible.

Apart from the foregoing, there are also known to the art measuring devices for the determination of displacements or shifts wherein, by means of a probe, there is detected the position of metallic rings arranged at a mutual spacing from one another in a tube. This tube is installed in the medium to be examined. This system is known as the radio peak probe system IDEL of the aforementioned Interfels Company. Upon passage of the probe through one of the metallic rings there is generated a signal, enabling determination of the location of such metallic ring and its position with respect to a reference peak. With one and the same probe it is possible to undertake measurements at different measuring locations or sites, but the measurements can only be accomplished with relatively small accuracy, and therefore, only can be practically employed for making the requisite determinations when great shifts or displacements are involved.

SUMMARY OF THE INVENTION

Therefore, it is a primary object of the present invention to overcome the aforementioned drawbacks and limitations of the prior art systems heretofore discussed.

Another and more specific object aims at the provision of a new and improved method of, and apparatus for, determining shifts at terrain and in structures or for similar or analogous applications, which renders possible reliably and accurately ascertaining even slight shifts or displacements, without there being required for this purpose great equipment expenditure.

Now in order to implement these and still further objects of the invention, which will become more readily apparent as the description proceeds, the method aspects of the present development are manifested by the features that by means of a measuring probe or sensor there are determined in succession the mutual spacing of at least two neighboring measuring locations which are defined by mechanical stops arranged to extend at a uniform spacing from one another in a hollow space extending through the medium to be examined. The measuring probe possesses at least two measuring heads which can be altered with respect to their mutual spacing and constructed as mechanical counter stops or impact members. Each counter stop is brought into contact with one of the stops and there is determined the relative position of the measuring heads.

The apparatus for the performance of the aforesaid method contemplates fixing the measuring locations by mechanical stops arranged at a uniform or equal spacing from one another within a hollow space extending through the medium to be examined. The mutual position of the stops or impact members is determined by a measuring probe. This measuring probe contains at least two interconnected measuring heads which can be altered at least as concerns their mutual spacing from one another. The measuring heads are structured as mechanical counter stops which coact with the stops or impact members, and there is provided at least one measuring device which measures the relative position of the measuring heads.

Not only is the invention concerned with the aforementioned method and apparatus aspects, but also, as mentioned, relates to a novel measuring probe for use in the apparatus serving for the determination of shifts or displacements in the ground or terrain, in rocks, in structures or buildings and the like, which measuring probe comprises at least two interconnected measuring heads which can be at least altered as concerns their mutual spacing from one another. The measuring heads are structured as mechanical counter stops which come into contact with mechanical stops or impact members arranged at a mutual spacing from one another in the medium to be examined. At least one measuring device serves for measuring the relative position of the measuring heads.

By means of the same portable measuring probe it is possible to undertake measurements at different locations or sites. These measurements can be faultlessly reproduced owing to the unambiguously defined position of the measuring heads relative to the measuring locations by virtue of the provision of the mechanical stops and counter stops. Since there is measured, by means of the measuring probe, the displacements between neighboring measuring locations, there is not required the formation of a difference between two large measuring values, as is the case with the heretofore known equipment for the determination of such displacement. Since the probe containing the sensitive measuring device does not remain in the medium which is to be examined, calibration and control or checking of the measuring device is possible at any time.

In order to render possible an accurate placement of the measuring probe the stop or impact surfaces of the stop members and the counter stops are preferably constructed as conical jacket surfaces or spherical surfaces or vice versa.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, in FIGS. 1 to 5 there has been schematically illustrated a first exemplary embodiment of apparatus for determining displacements or shifts in terrain and structures or the like. This apparatus will be seen to comprise a measuring tube 1 which is embedded in a hollow space within the terrain 2, for instance in the ground or in a rock formation or the like. In this measuring tube 1 there are mounted at a uniform spacing from one another, for instance every 1.5 meters, the measuring markers 3. The spacing or the distance change between neighboring markers 3 is measured by means of a measuring probe or sensor 4, in a manner still to be described more fully hereinafter. This measuring probe 4 will be seen to comprise two measuring heads 5, which for each measurement can be brought into contact with the measuring markers 3.

Figure 2:
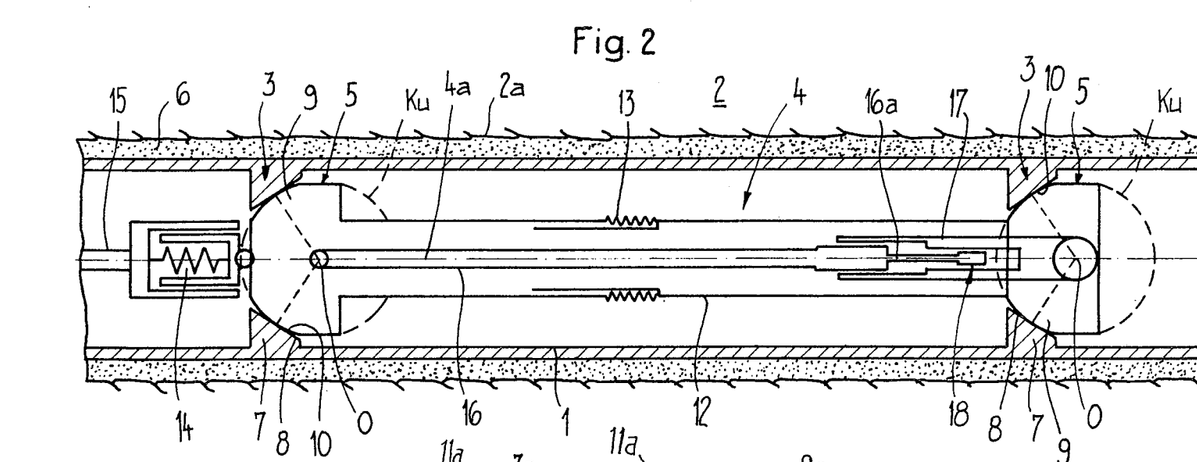
FIG. 2 partially illustrates in sectional view part of the apparatus of FIG. 1 showing the measuring probe in its measuring position.
Figure 3:
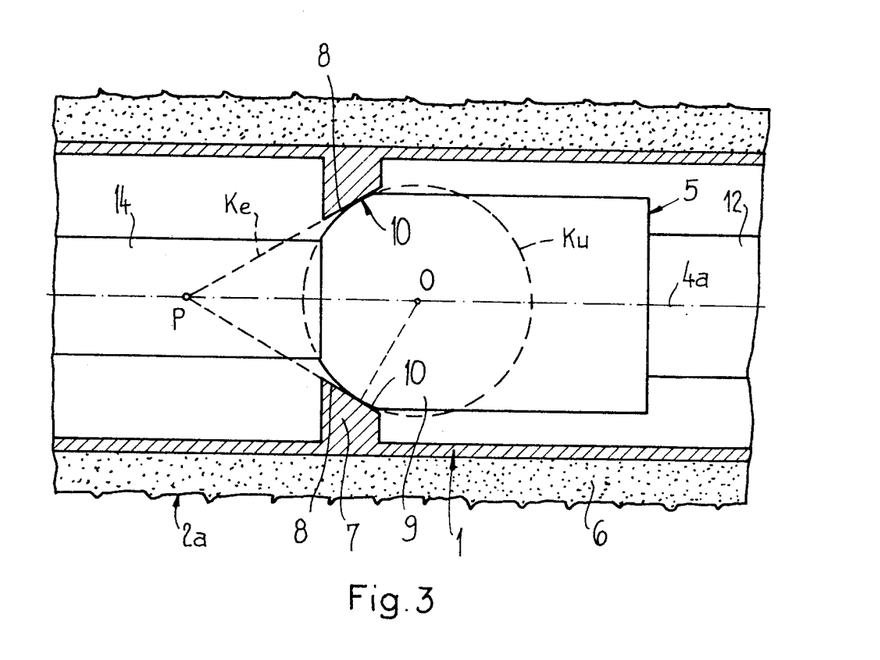
FIG. 3 is an enlarged view in relation to the showing of FIG. 2, illustrating the region of a measuring head of the measuring probe located in its measuring position.
Figure 4:
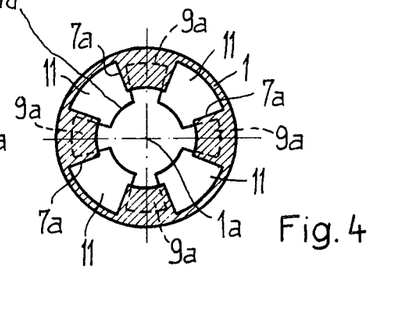
FIGS. 4 and 5 are respective sectional bottom views of a measuring head, bearing upon a stop or impact member, shown in its measuring and displacement position, respectively.
Figure 5:
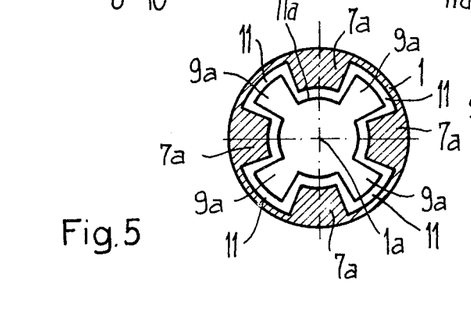

In FIGS. 2 to 4 there has been shown in greater detail the construction of the measuring probe 4 and the measuring markers 3. As best seen by referring to FIGS. 2 and 3, the measuring tube 1 is fixedly connected by means of mortar 6 or another suitable material with the wall 2a of the not particularly referenced bore hole formed in the terrain 2. The measuring markers 3 are formed by the mechanical stops or impact members 7 which protrude into the interior of the measuring tube 1. Each stop or impact member 7 has a stop or impact surface 8 which is part of the jacket or outer surface of a right circular cone Ke, shown in broken or phantom lines in FIG. 3 and whose apex or tip P is located along the lengthwise axis 4a of the measuring probe 4.

These stops or impact members 7, in the measuring position of the measuring probe 4, coact with counter stops or impact members 9. These counter stops 9 can be formed either as part of each measuring head 5 or mounted at the latter. These counter stops 9 are likewise provided with a stop or impact surface 10, forming part of the surface of a sphere Ku (FIG. 3), the center O of which likewise is located at the measuring probe-longitudinal axis 4a. To render possible a displacement of the measuring probe 4 in the lengthwise direction of the measuring tube 1, each stop is formed by a number of, for instance as illustrated four portions or sections 7a, offset in each case by 90° with respect to one another and between which there is formed a respective gap 11, as best seen by referring to FIGS. 4 and 5. Each counter stop 9 consists of a corresponding number, that is to say in this case, likewise four sections or portions 9a which are mutually offset from one another by a gap or space 11a likewise through 90° with respect to one another. In the measuring position of the measuring probe 4 the counter stop portions or sections 9a come to bear against the stop or impact sections 7a, as the same has been shown in FIG. 4. By rotating the measuring probe 4 about its lengthwise 4a, through an angle of about 45°, the counter stop portions or sections 9a are placed into the gaps or spaces 11 between the stop sections or portions 7a, enabling a displacement of the measuring probe 4 in the lengthwise direction of the measuring tube 1, as best recognized by referring to FIG. 5.

Both of the measuring heads 5 are rigidly interconnected with one another by means of a connection tube 12. The connection between the measuring heads 5 and the connection tube 12 can also be a hinged connection, but however rotationally fixed with respect to one another. The connection tube 12 is constructed as a bipartite element, wherein both parts are interconnected by means of a tension or traction spring 13 or equivalent structure and each part is connected with a respective one of the measuring heads 5. The spacing between both of the measuring heads 5 is therefore variable. A traction or pull rod 15 or the like is attached by a dynamometer 14 with one measuring head 5. By means of the traction rod 15, the dynamometer 14 and the tension spring 13 there is insured that, in the measuring position of the measuring probe 4, both of the measuring heads 5 bear with the necessary contact pressure or force against the stops or impact members 7. Within the connection tube 12 there is arranged the actual length or distance measuring device, containing a rod 16. This rod 16 is attached at one measuring head 5 at the sphere center O of the impact surfaces 10 and engages into a hollow rod 17. This hollow rod 17 is secured to the other measuring head 5 likewise at the center O of the sphere. The connection between the rod 16 and the hollow rod 17 and the related measuring head 5 can be rigid or can be accomplished by means of a Cardan joint or suspension arrangement. The rod 16 and the hollow rod 17 are relatively displaceable with respect to one another in the direction of the lengthwise axis 4a of the measuring probe 4. Internally of the hollow rod 17 there is arranged a conventional and therefore only schematically illustrated length or displacement transmitter 18, which in the present exemplary embodiment is constituted by a differential transformer. This differential transformer, as is well known, contains a moving or plunger-type armature attached at the front portion 16a of the rod 16 and, with changes of the spacing between both of the measuring heads 5, moves relative to the stationary coils of the differential transformer, which in standard fashion produces an electrical signal which is proportional to the magnitude of the displacement of the moving armature.

To measure the spacing or the change in spacing between two neighboring measuring markers 3 the measuring probe 4 is placed into the measuring position shown in FIG. 2. As already mentioned, the measuring heads 5 are pressed against the measuring markers 3 by the action of the traction or tension rod 15, the dynamometer 14 and the tension spring 13. The counter stops or impact members 9 therefore come to bear against the stops or impact members 7. Due to the described construction of the stop or impact surfaces 8 and 10 as circular conical jacket surfaces or spherical surfaces there is insured for a faultless, exact and always constant seating of the measuring heads 5 upon the measuring markers 3. The contact of the counter stops 9 with the stops 7 is thus accomplished along a circle. The spacing or change in spacing between the measuring heads 5 bearing upon the stops 7 is detected in the aforementioned manner by means of the length or displacement transmitter 18. The output signal of the length transmitter 18 is evaluated by any suitable and therefore not particularly further shown evaluation circuit. Since the spacing or change in spacing between the measuring heads 5 corresponds to the spacing or change in spacing, as the case may be, between the measuring markers 3, it is therefore possible to determine whether the spacing between these measuring markers 3 has altered owing to any shift or displacements which have occurred within the terrain. The length transmitter 18 can be adjusted such that the output signal produced thereby is characteristic of the deviation of the spacing between the measuring heads 5 from a rated or standard value, corresponding to the reference value of the spacing between two measuring markers.

Figure 1:
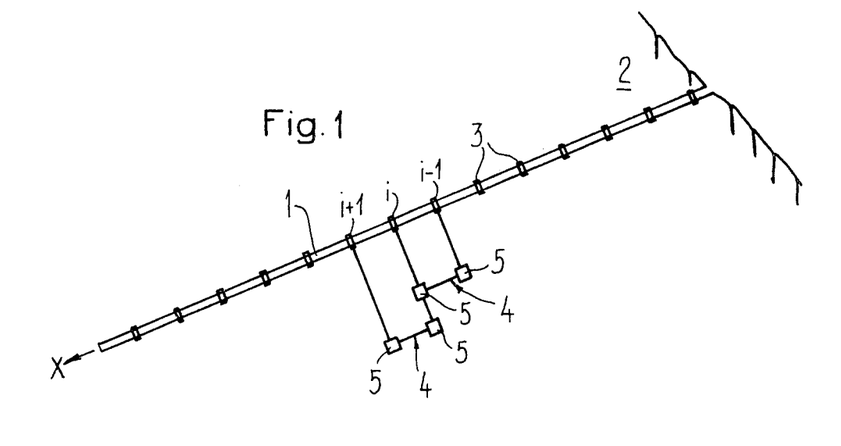
FIG. 1 illustrates an apparatus for the determination of displacements in one direction.

As best seen by reverting to FIG. 1, the measuring probe 4 is progressively brought into contact in each case with two neighboring measuring markers 3 in the lengthwise direction of the measuring tube 1. In the measuring position i the measuring probe 4 measures the spacing or change in spacing between the measuring markers i and i-1. In the next following measuring position i+1, designated by reference character 4', it is possible by means of the measuring probe 4 to measure the spacing or change in spacing between the measuring markers i+1 and i. By summing the individual measuring values obtained in this manner it is possible to determine the relative displacement of each measuring marker 3 with respect to an assumed fixed point in the direction X of the axis of the measuring tube 1.

The exemplary embodiment illustrated in FIGS. 6 to 10 enables, apart from the determination of the displacement in the direction of the lengthwise axis of the measuring tube, also a measurement of the displacement in the directions Y and Z, which are perpendicular to the aforementioned direction X, i.e. the direction of the lengthwise axis of the measuring tube. Just as was the case for the exemplary embodiment of FIG. 1, also with this modified construction there is embedded a measuring tube or pipe 1 in a hollow space in the ground or rock 2, as best seen by referring to FIG. 6. Within the measuring tube 1 there are mounted at uniform spacing from one another, for instance at a mutual spacing of 1.5 meters, the measuring markers 3. These measuring markers 3 are constructed as stop or impact members, in the same manner as with the embodiment of FIGS. 1 to 5 previously discussed. The impact surfaces of the stop or impact members constitute part of the outer or jacket surface of a right circular cone. Each stop, as already described, comprises for instance four sections or portions, each mutually offset by 90° with respect to one another and between which there is formed a respective gap or opening. The relative position of neighboring measuring markers 3 is determined by means of a measuring probe or sensor 19 having three mutually interconnected measuring heads 20.

Figure 7:
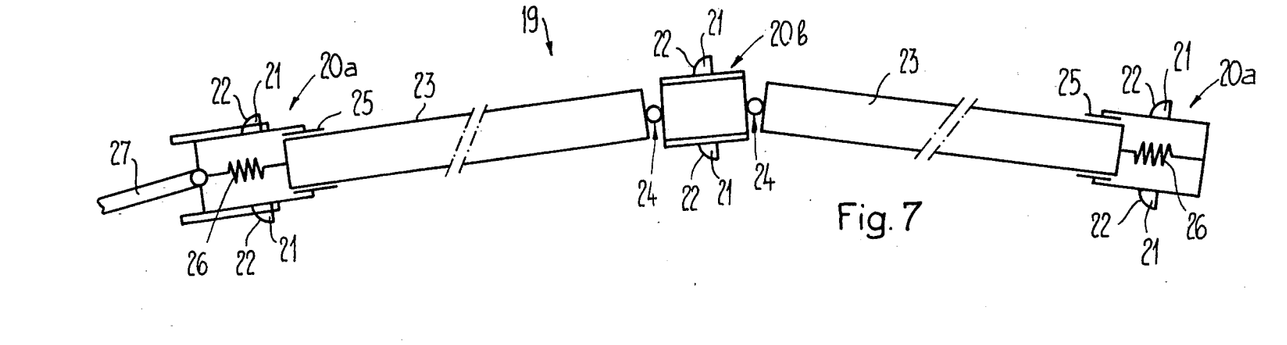
FIG. 7 is a side view of a measuring probe for use with the apparatus of FIG. 6.
Figure 8:
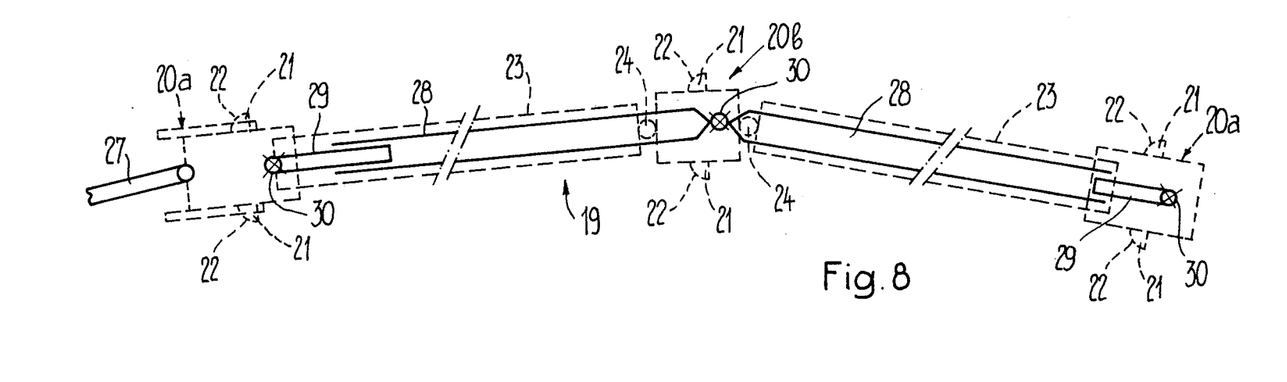
FIG. 8 illustrates the internal part of the measuring probe shown in FIG. 7.

The measuring probe 19 is shown in greater detail in FIGS. 7 and 8. Each measuring head 20 will be seen to be provided with counter stop elements 21 which are distributed about the circumference thereof. These counter stop elements 21, similar to the counter stop elements or sections 9a, are separated from one another by a respective gap or opening. Each counter stop element 21 is provided with a stop or impact surface 22, forming part of a spherical surface. The counter stop elements 21 therefore correspond in their design, as well as also in their mode of operation, to the counter stop sections or portions 9a of the embodiment of FIGS. 1 to 5 discussed above. Neighboring measuring heads 20 are mutually interconnected by means of the connection tubes 23. Each of the connection tubes 23 is mounted at one end, by means of a hinge connection 24, at the intermediate measuring head 20b. This hinge connection 24 possesses two hinge shafts or axes dispositioned at right angles with respect to one another and with respect to the lengthwise axis of the connection tube 23. These connection tubes 23 are non-rotatably connected with the measuring head 20b. At the other end each connection tube 23 is non-rotatably connected so as to be lengthwise displaceable with an outer measuring head 20a, as the same has been schematically indicated by the lengthwise or longitudinal guides 25. Between the connection tube 23 and the related outer measuring head 20a there is arranged a tension spring 26 or equivalent structure. Engaging at a measuring head 20a, if desired by means of a not particularly illustrated dynamometer, is a traction or tension rod 27. By means of the tension springs 26 the measuring heads 20b and 20a are pressed, by means of their counter impact or stop elements 21, against the measuring markers 3 with the necessary contact pressure. Internally of the connection tube 23, as shown in FIG. 8, there is accommodated the actual measuring device. In each connection tube 23 there extend coaxially with respect to the just mentioned connection tube 23 substantially rod-shaped elements 28 and 29 of the measuring system. These rod-shaped elements or parts 28 and 29 are displaceable relative to one another in the lengthwise direction of the connection tube 23. Both of the measuring system parts 28 are attached by means of a Cardan joint or suspension arrangement 30 at the intermediate measuring head 20b, whereas the other measuring system parts 29 likewise are mounted by means of a Cardan joint or suspension arrangement at an outer measuring head 20a. The center of each of the Cardan suspensions 30 coincides with the center of the sphere which determines the impact surfaces 22 of the counter impact elements 21.

In this way there is insured that with the counter impact elements 21 bearing upon the stops or impact members, the measuring points, whose relative position is to be measured, are exactly fixed.

Figure 9:
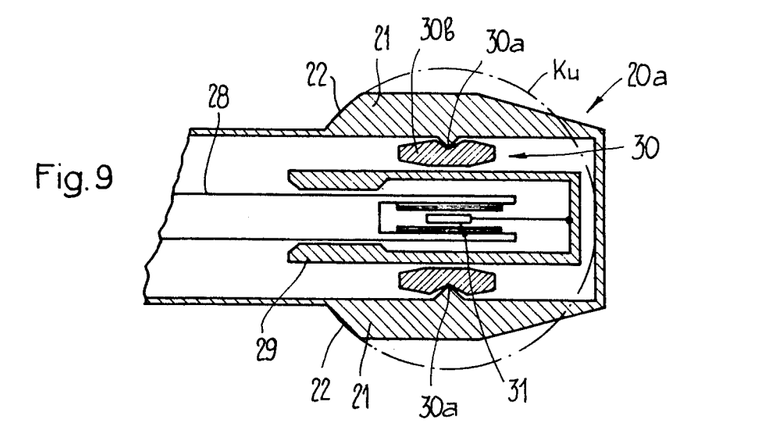
FIG. 9 illustrates details of an outer measuring head.

The construction of both outer measuring heads 20a will be evident from the illustration of FIG. 9. In order to measure the spacing or the change in spacing between neighboring measuring heads 20a and 20b in the lengthwise directon of the measuring probe 19 there is provided a length or displacement transmitter 31 or equivalent structure, likewise preferably designed as a differential transformer and having the same function as the length transmitter 18 of the measuring probe 4 previously considered. The moving armature of the differential transformer is connected with the hollow rod-shaped measuring system part or element 29, so that a relative movement between the measuring system parts 28 and 29 causes, in the manner previously described, generation of a corresponding output signal at the length transmitter 31.

The Cardan suspension 30 will be seen to comprise two edges situated diametrically opposite one another and formed at the measuring head 20a, within which there is mounted a hinge or pivot ring 30b. This hinge or pivot ring 30b is provided at its inner surface likewise with two oppositely situated edges, not visible in FIG. 9 however since they are shifted through 90° in relation to the edges or blades 30a in the circumferential direction of the hinge ring 30b. Mounted in such edge or edge means is the measuring system part 29 provided at the hinge ring 30b.

Figure 10:
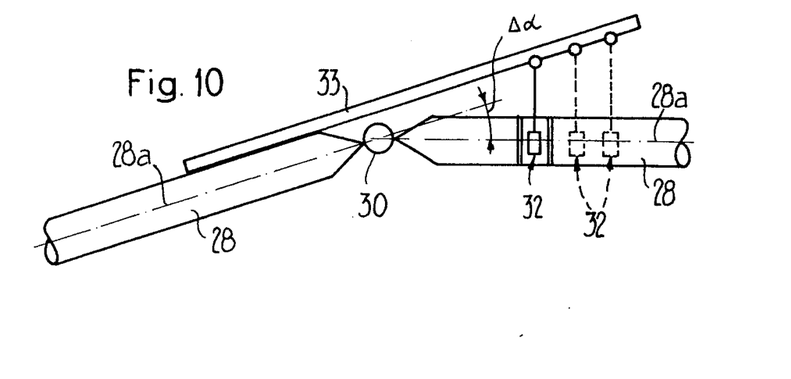
FIG. 10 illustrates the region of the intermediate measuring head of the measuring probe of FIG. 7.

Now in FIG. 10 there is schematically illustrated the construction of the intermediate measuring head 20b. To measure the angle between both of the lengthwise extending axes 28a of the measuring system parts 28 there is provided a conventionally constructed measuring magnitude converter 32. With the embodiment under discussion this measuring magnitude converter 32 is a length or displacement transmitter, specifically a differential transformer which is similarly constructed as the length transmitter 31 and mounted such that the movement direction of the moving armature extends approximately at right angles to the movement direction of the moving armature of the length transmitter 31. This moving armature of the length transmitter 32 is connected with an extension element 33, attached to a measuring system part 28 and extending parallel to its lengthwise axis 28a. If one of both parts 28 is rotated with respect to the other part, then this produces a corresponding movement of the moving armature of the length transmitter 32, and thus, in the described manner causes the generation of an output signal. In FIG. 10 there have been shown in broken or phantom lines two further length transmitters 32, wherein for a given deflection angle $\Delta\alpha$ the moving armature moves through a greater path than the moving armature of the length transmitter 32. Depending upon the degree of deflection and the desired measuring accuracy it is possible to also resort to the use of the suitable length transmitter for measurement. For a determination of the angle $\Delta\alpha$ there is however sufficient a single length transmitter.

The mode of operation of the apparatus disclosed in FIGS. 6 to 10 extensively corresponds to that of the exemplary embodiment of FIGS. 1 to 5. The measuring probe 19 is brought into its measuring position, where by means of the tension rod 27 and the tension springs 26 the counter stops or impact elements 21 are pressed against the stops or impact elements of the stop members. Due to the construction of the stop surfaces as part of a circular cone jacket surface or a sphere, it is possible, as already described, to insure for exact positioning of the measuring heads 20. By means of the length transmitter 31 there is determined the spacing or changes in spacing between the measuring heads 20a and 20b, i.e., in other words the spacing or changes in spacing between neighboring measuring markers 3, in the manner already previously fully disclosed. All possible shifts or displacements of the measuring markers 3 in the lengthwise direction of the measuring tube 1, i.e. in the direction X, therefore can be reliably determined in this manner.

The displacement of a measuring marker 3 transversely with respect to the direction X, for instance in the direction Y, causes the intermediate measuring head 20b, bearing upon such measuring marker 3, to be laterally shifted in this direction Y in relation to both of the outer measuring heads 20a. This lateral shifting, in turn, causes an angle $\Delta\alpha$ to be formed between the lengthwise axes 20a of the measuring system parts 28, as best seen by referring to FIG. 10. This angle $\Delta\alpha$ is measured by means of the length transmitter 32 and then serves as the output magnitude for computation of the lateral displacement or shifting of the measuring head 20b with respect to the connection line between both of the outer measuring heads 20a. By rotating the measuring probe 19 about its lengthwise axis through 90° there is determined, in corresponding manner, the lateral displacement of the measuring head 20b in the direction Z.

Figure 6:
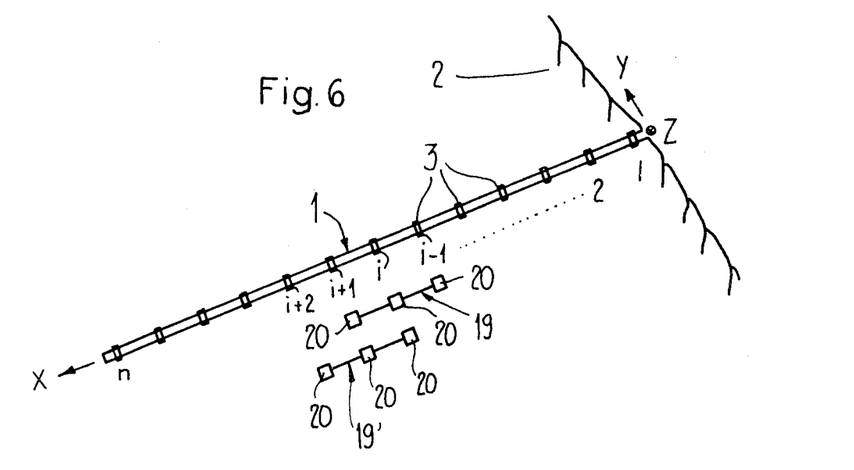
FIG. 6 illustrates an embodiment of apparatus for the determination of displacements in three directions which are at right angles to one another.

When performing a measurement the measuring probe 18 is successively brought into different measuring positions in the lengthwise direction of the measuring tube 1. In each measuring position there is accomplished, in the described manner, a distance or position measurement in the directions X, Y, Z. In FIG. 6 the measuring probe 19 has been illustrated in the measuring position i in which, on the one hand, there are measured the distances or changes in distance or spacing between the measuring markers i and i−1 and i and i+1 and there is determined the lateral displacement or shifting of the measuring marker i with respect to the measuring markers i−1 and i+1. In the following measuring position i+1, illustrated by the measuring probe 19′, there is accomplished a corresponding distance or distance change measurement between the measuring markers i+1 and i and i+1 and i+2, respectively, as well as a determination of the lateral shifting or displacement of the measuring markers i+1 with respect to both of the neighboring measuring markers i and i+2. By summing the individual measurement or measuring values it is possible to determine the relative or the absolute spatial position of each measuring marker 3 with respect to a fixed point or a fixed direction.

By means of the same measuring probes 4 or 19, respectively, it is possible to undertake measurements at different measuring locations. As the site fixed installation in the medium which is to be examined there is only required the measuring tube 1 containing the measuring markers 3, whereas the measuring probe, as already explained, is portable. This additionally enables undertaking, at any point in time, a faultless checking of the functionality of the measuring device, i.e. the length or displacement transmitters 18,31 and 32. By means of the measuring probes 4 and 19, respectively, it is possible to perform measurements at different points along the measuring tube 1.

Due to the special design of the stops or impact members 7 and the counter stops or impact members 8 and 21, respectively, there is possible an exact and always constant clamping of the measuring probes 4 and 19, as the case may be, between the measuring markers 3. As a result it is possible to reproduce measurements with increased accuracy. The measuring probes 4 and 19 render possible the direct measurement of the relative positional shifting or displacement of neighboring measuring markers 3, without there being required for this purpose the initial formation of the difference between two large measuring values.

In order to maintain the effect of the temperature as small as possible upon the measurement operations, the measurement markers 3 and the parts of the measuring probes 4, 19, decisive for the measurement, are formed of a material which is as insensitive as possible to temperature. By appropriate selection of the material it is additionally possible to compensate for temperature influences. For the measurement of the displacements transverse to the measuring tube-lengthwise axis there are performed two measurements, wherein the measuring probe 19 is rotated, between the measurements, about its lengthwise axis through 180°. In this way there is eliminated the influence of temperature or other error sources.

It should be understood that the length transmitters 18 and 31 and the measurement magnitude converter 32 can also be constructed differently than herein described. Additionally, it also conceivable to construct the stop surface 8 of the stops or impact members 7 as spherical surfaces and to impart the configuration of conical jacket surfaces to the stop or impact surfaces 10 and 22 of the counter stops or impact members 9 and 21, respectively. The described apparatus constructions are particularly suitable for determining shifts or displacements which arise in terrain, i.e., in the ground or in rock formations, as well as in structures or buildings, such as fills, storage basins or reservoirs, tunnels, caverns, bridges, pilings, slotted walls and the like.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A method of determining displacements in terrain, rock formations, structures and buildings and the like, comprising the steps of:
    defining by means of mechanical stops arranged by a uniform spacing from one another and extending through a hollow space of the medium which is to be examined at least two neighboring measuring locations;
    determining in succession by a measuring probe having at least two mechanical counter stops the mutual position of said at least two neighboring measuring locations;
    said counter stops having measuring heads which can be varied at least with respect to their mutual spacing;
    said step of determining said mutual position of the neighboring measuring locations comprising:
        bringing each counter stop into contact with a related stop; and
        detecting the relative position of the measuring heads.

2. The method as defined in claim 1, further including the steps of:
    utilizing a measuring probe having three measuring heads;
    placing into contact each of the three measuring heads of the measuring probe with a respective one of three stops; and
    determining both the spacing between the measuring heads and also the lateral deviation of one of the measuring heads with respect to both other measuring heads.

3. An apparatus for determining displacements in terrain, rocks, structures, buildings and the like, comprising:
    mechanical stops defining measuring locations arranged at a uniform spacing from one another in a hollow space extending through the medium which is to be examined;
    a measuring probe for determining the mutual spacing between said mechanical stops;
    said measuring probe containing at least two interconnected measuring heads;
    means for interconnecting and altering the mutual spacing of the measuring heads with respect to one another;
    said measuring heads being provided with mechanical counter stop members coacting with said stops; and
    at least one measuring device for measuring the relative position of the measuring heads.

4. The apparatus as defined in claim 3, wherein:
    said stops have impact surfaces formed by a conical jacket surface; and
    said counter stop members have impact surfaces formed by a spherical surface.

5. The apparatus as defined in claim 3, wherein:
    the impact surfaces of the stops are formed by a conical surface; and
    the impact surfaces of the counter stop members are formed by a conical jacket surface.

6. The apparatus as defined in claim 3, further including:
    tube means embedded in the medium which is to be examined; and
    said stops being arranged at the inner surface of said tube means.

7. The apparatus as defined in claim 3, wherein:
    both said stops and said counter stop members comprise a plurality of mutually separated portions defining between each two neighboring portions a gap.

8. The apparatus as defined in claim 7, wherein:
    each stop and each counter stop member is composed of four portions offset with respect to one another by an angle of approximately 90°.

9. The apparatus as defined in claim 3, wherein:
    said means for interconnecting said measuring heads rigidly interconnects said measuring heads non-rotatably with one another.

10. The apparatus as defined in claim 3, wherein:
    said means for interconnecting said measuring heads hingedly interconnects said measuring heads but non-rotatably with one another.

11. The apparatus as defined in claim 10, wherein: the hinge connection between the measuring heads comprises two hinge shafts dispositioned at essentially right angles to one another and with respect to the lengthwise axis of the measuring probe.

12. The apparatus as defined in claim 3, wherein:
    said measuring probe comprises three measuring heads;
    two of said measuring heads defining outer measuring heads and being hingedly connected but nonrotatably with the third measuring head defining an intermediate measuring head and being connected in variable spaced relationship from one another;

said one measuring device serving for measuring the spacing or change in spacing between the interconnected measuring heads; and a further measuring device for measuring the lateral deviation of one measuring head with respect to both of the other measuring heads.

13. The apparatus as defined in claim 12, wherein: the measuring device for measuring the spacing or change in spacing between two measuring heads comprises an inductive length transmitter.

14. The apparatus as defined in claim 12, wherein: the measuring device for measuring the lateral deviation of the intermediate measuring head comprises a measuring magnitude converter for measuring the angle between the connection axes between the intermediate measuring head and the outer measuring heads.

15. The apparatus as defined in claim 14, wherein: said measuring magnitude converter comprises at least one inductive length transmitter.

16. The apparatus as defined in claim 12, further including:

tube means surrounding the measuring device for interconnecting the measuring heads with one another; and said tube means being mounted hingedly however non-rotatably at one of the measuring heads and fixedly at another of the measuring heads.

17. The apparatus as defined in claim 3, wherein: the measuring device serves for measuring the spacing and change in spacing between two measuring heads and comprises two components displaceable relative to one another in the direction of the lengthwise axis of the measuring probe; and a Cardan suspension means for connecting each component at the center of a sphere determining impact surfaces of the counter stop members.

18. A measuring probe for use in equipment for determining displacements in terrain, rock formations, structures, buildings and the like, comprising:

at least two measuring heads;

means for interconnecting the measuring heads to be at least variable in their mutual distance with respect to one another;

said measuring heads being formed as mechanical counter stop members intended to come into contact with mechanical stops arranged in mutual spaced relationship from one another at the medium which is to be examined;

said counter stop members being provided with at least one gap extending in the lengthwise direction of the probe and opening towards the outside surface of said counter stop member; and at least one measuring device for measuring the relative position of the measuring heads.

19. The measuring probe as defined in claim 18, wherein: the counter stop members have impact surfaces formed by a spherical surface.

20. The measuring probe as defined in claim 18, wherein: the counter stop members are formed of a number of portions which are separated from one another between each two neighboring portions by a respective gap.

21. The measuring probe as defined in claim 20, wherein: each counter stop member is composed of four portions offset with respect to one another by 90°.

22. The measuring probe as defined in claim 18, wherein:

said interconnecting means include structure for interconnecting two of the measuring heads rigidly but non-rotatably with one another.

23. The measuring probe as defined in claim 18, wherein:

said interconnecting means include structure for interconnecting two of the measuring heads hingedly but non-rotatably with one another.

24. The measuring probe as defined in claim 23, wherein:

the hinge connection between the measuring heads comprises two hinge shafts extending mutually perpendicular to one another and with respect to the lengthwise axis of the measuring probe.

25. The measuring probe as defined in claim 18, wherein: the measuring probe comprises three measuring heads;

two of the measuring heads defining outer measuring heads and being connected hingedly but non-rotatably with the third measuring head defining an intermediate measuring head and being connected in variable spaced relationship from one another;

said one measuring device serving for measuring the spacing and spacing changes between the interconnected measuring heads; and a further measuring device serving for measuring the lateral deviation of one of the measuring heads with respect to both other measuring heads.

26. The measuring probe as defined in claim 25, wherein: the measuring device for measuring the spacing or change in spacing between two measuring heads comprises a length transmitter.

27. The measuring probe as defined in claim 26, wherein:

said length transmitter is an inductive length transmitter.

28. The measuring probe as defined in claim 25, wherein:

the measuring device for measuring the lateral deviation of the intermediate measuring head comprises a measuring magnitude converter for measuring the angle between the connection axes between the intermediate measuring head and the outer measuring heads.

29. The measuring probe as defined in claim 28, wherein:

said measuring magnitude converter comprises at least one length transmitter.

30. The measuring probe as defined in claim 29, wherein:

said length transmitter is an inductive length transmitter.

31. The measuring probe as defined in claim 25, wherein:

the measuring device serves for measuring the spacing and change in spacing between two of said measuring heads and comprises two components displaceably mounted relative to one another in the direction of the lengthwise axis of the measuring probe; and Cardan suspension means for connecting one of the components at one measuring head at the center of a sphere determining impact surfaces of the counter stop members.

32. The measuring probe as defined in claim 18, further including:

tube means surrounding the measuring device and interconnecting the measuring heads with one another; and said tube means being connected hingedly but non-rotatably with one of the measuring heads and rigidly with the other measuring head.

33. A measuring probe for use in equipment for determining displacements in terrain, rock formations, structures, buildings and the like, comprising:
at least two measuring heads;
means for interconnecting the measuring heads to be at least variable in their mutual distance with respect to one another;
said measuring heads being formed as mechanical counter stop members intended to come into contact with mechanical stops arranged in mutual spaced relationship from one another at the medium which is to be examined;
said counter stop members being provided with at least one gap extending in the lengthwise direction of the probe and opening towards the outside surface of said counter stop member;
said counter stop members have impact surfaces formed by a conical jacket surface; and
at least one measuring device for measuring the relative position of the measuring heads.

34. A measuring probe for use in equipment for determining displacements in terrain, rock formations, structures, buildings and the like, comprising:
three measuring heads;
means for interconnecting the measuring heads to be at least variable in their mutual position with respect to one another;
said measuring heads being formed as mechanical counter stop members intended to come into contact with mechanical stops arranged in mutual spaced relationship from one another at the medium which is to be examined;
at least one measuring device for measuring the relative position of the measuring heads;
two of the measuring heads defining outer measuring heads and being connected hingedly but non-rotatably with the third measuring head defining an intermediate measuring head and being connected in variable spaced relationship from one another;
said one measuring device serving for measuring the spacing and spacing changes between the interconnected measuring heads; and
a further measuring device for measuring the lateral deviation of one of the measuring heads with respect to both other measuring heads.

35. The measuring probe as defined in claim 34, wherein:
the counter stop members have impact surfaces formed by a spherical surface.

36. The measuring probe as defined in claim 34, wherein:
the counter stop members have impact surfaces formed by a conical jacket surface.

37. The measuring probe as defined in claim 34, wherein:
the counter stop members are formed of a number of portions which are separated from one another between each two neighboring portions by a respective gap.

38. The measuring probe as defined in claim 37, wherein: each counter stop member is composed of four portions offset with respect to one another by 90°.

39. The measuring probe as defined in claim 34, wherein:
the measuring device for measuring the spacing or change in spacing between two measuring heads comprises a length transmitter.

40. The measuring probe as defined in claim 39, wherein:
said length transmitter is an inductive length transmitter.

41. The measuring probe as defined in claim 34, wherein:
the measuring device for measuring the lateral deviation of the intermediate measuring head comprises a measuring magnitude converter for measuring the angle between the connection axes between the intermediate measuring head and the outer measuring heads.

42. The measuring probe as defined in claim 41, wherein:
said measuring magnitude converter comprises at least one length transmitter.

43. The measuring probe as defined in claim 42, wherein:
said length transmitter is an inductive length transmitter.

44. The measuring probe as defined in claim 34, wherein:
the hinge connection between the measuring heads comprises two hinge shafts extending mutually perpendicular to one another and with respect to the lengthwise axis of the measuring probe.

45. The measuring probe as defined in claim 34, further including:
tube means surrounding the measuring device and interconnecting the measuring heads with one another; and
said tube means being connected hingedly but non-rotatably with one of the measuring heads and rigidly with the other measuring head.

46. The measuring probe as defined in claim 34, wherein:
the measuring device serves for measuring the spacing and change in spacing between two of said measuring heads and comprises two components displaceably mounted relative to one another in the direction of the lengthwise axis of the measuring probe; and
Cardan suspension means for connecting one of the components at one measuring head at the center of a sphere determining impact surfaces of the counter stop members.

* * * * *